(12) United States Patent
Brazier et al.

(10) Patent No.: US 7,168,333 B2
(45) Date of Patent: Jan. 30, 2007

(54) MONITORING SYSTEM FOR PRESSURIZED CONTAINER

(75) Inventors: Geof Brazier, Woodbury, MN (US); John P. Clark, III, Tulsa, OK (US); John E. Smallwood, Singapore (SG)

(73) Assignee: BS&B Safety Systems Limited, Limerick (IE)

( * ) Notice: Subject to any disclaimer, the term of this patent is extended or adjusted under 35 U.S.C. 154(b) by 0 days.

(21) Appl. No.: 10/226,217

(22) Filed: Aug. 23, 2002

(65) Prior Publication Data

US 2003/0071736 A1 Apr. 17, 2003

Related U.S. Application Data

(60) Provisional application No. 60/314,291, filed on Aug. 24, 2001.

(51) Int. Cl.
*G08B 19/00* (2006.01)
*G08B 23/00* (2006.01)

(52) U.S. Cl. ............... 73/865.8; 73/52; 73/862.382; 137/551; 137/552; 137/557; 340/603; 340/606

(58) Field of Classification Search .............. 73/1.71, 73/37, 52; 137/15.11, 551, 552, 557; 340/603, 340/605, 606, 611, 626
See application file for complete search history.

(56) References Cited

U.S. PATENT DOCUMENTS

| | | | | |
|---|---|---|---|---|
| 4,342,988 A | * | 8/1982 | Thompson et al. | ......... 340/679 |
| 4,408,194 A | * | 10/1983 | Thompson | ................. 340/626 |
| 4,479,460 A | * | 10/1984 | Webber | ................. 123/41.27 |
| 4,823,116 A | * | 4/1989 | Kitchen et al. | ............. 340/603 |
| 4,928,255 A | * | 5/1990 | Brennecke et al. | ......... 700/301 |
| 4,945,939 A | * | 8/1990 | Maxwell et al. | ............... 137/93 |
| 5,117,675 A | * | 6/1992 | Notoyama et al. | ............. 73/37 |
| 5,441,070 A | * | 8/1995 | Thompson | ..................... 137/1 |
| 5,560,392 A | * | 10/1996 | Spang et al. | ................. 137/552 |
| 5,921,266 A | | 7/1999 | Meyer | ..................... 137/68.14 |
| 6,035,878 A | * | 3/2000 | Adams et al. | ................. 137/1 |
| 6,124,806 A | | 9/2000 | Cunningham et al. | |
| 6,283,138 B1 | * | 9/2001 | Friend et al. | ................. 137/14 |
| 6,366,217 B1 | | 4/2002 | Cunningham et al. | |
| 6,505,507 B1 | * | 1/2003 | Imao et al. | ................. 73/146.5 |
| 2001/0037093 A1 | * | 11/2001 | Benkowski et al. | ... 604/288.01 |

FOREIGN PATENT DOCUMENTS

EP 0 092 323 A1 10/1983
EP 0 400 818 A1 12/1990

OTHER PUBLICATIONS

International Search Report, dated Nov. 18, 2002.

* cited by examiner

*Primary Examiner*—Hezron Williams
*Assistant Examiner*—David A. Rogers
(74) *Attorney, Agent, or Firm*—Finnegan, Henderson, Farabow, Garrett & Dunner, L.L.P.

(57) ABSTRACT

A system and method of monitoring a pressurized container having an auxiliary device are provided. The system includes a sensor operable to provide a signal representative of at least one operating condition of the pressurized container. The system also includes a control operable to receive the signal from the sensor and generate a warning when the sensed operating condition will impact the operation of the auxiliary device.

41 Claims, 6 Drawing Sheets

MONITORING SYSTEM FOR PRESSURIZED CONTAINER

RELATED APPLICATIONS

This application claims the benefit of U.S. Provisional Application No. 60/314,291, filed on Aug. 24, 2001, which is expressly incorporated herein by reference.

BACKGROUND OF THE INVENTION

This invention generally relates to a method and system for monitoring a pressurized container. More particularly, the present invention relates to a monitoring system for a pressurized container that includes a safety device or an information providing device.

Containers, such as, for example, systems, piping, or tanks, that contain a fluid that is pressurized or that may be pressurized often include pressure reduction equipment that is designed to ensure the safety of the container and/or to provide information about the operation of the system. This pressure reduction equipment may include, for example, pressure relief devices, pressure release devices, pressure control systems, pressure indicating devices, pressure driven switching devices, temperature indicating devices, fluid pH level indicating devices, and vibration indicating devices.

Pressure relief devices are commonly used as safety devices to prevent fluid containers from experiencing potentially hazardous over-pressure or under-pressure conditions. The pressure relief devices are designed to activate, or open, when the pressure of the fluid within the container reaches a predetermined pressure limit that is indicative of an over-pressure condition. The activation of the pressure relief device creates a vent path through which fluid may escape to relieve the over-pressure situation in the pressurized container.

A pressure relief device, which may include, for example, rupture disks, pressure relief valves, pressure safety valves, control valves, butterfly valves, gate valves, globe valves, diaphragm valves, buckling pin devices, tank vents, explosion panels, or other such devices, may be connected to the container so that at least a portion of the pressure relief device is exposed to the fluid within the container. When the fluid reaches or exceeds the predetermined pressure limit, the force of the fluid on the pressure relief device acts on the pressure relief device to activate the pressure relief device, thereby creating an opening. Fluid may then escape from the container through the opening to relieve the over-pressure condition.

Pressure release devices are commonly used to allow the movement of a pressurized fluid from one container to another container or system. The pressure release devices, which may be, for example, control valves, butterfly valves, gate valves, globe valves, ball valves, diaphragm valves, or other such devices, are connected to the container so that at least a portion of the pressure release device is exposed to the fluid within the container. The pressure release devices are designed to activate, or open, on demand. This activation can be manual or automatic, based upon the requirements of the user. When fluid is required to be discharged from the container, the pressure release device may be activated to create an opening. The activation of the pressure release device creates a vent path through which fluid may escape from the pressurized container.

A combination of different types of pressure reduction equipment may be included in a container. For example, a pressure relief device may be engaged with the system to provide protection from an over pressure situation within the particular container. A pressure release device may be engaged with the container to allow the discharge of fluid from the container upon the command of an operator or an appropriate automatic sensing system when certain internal or external conditions are experienced that warrant discharge of the pressurized fluid from the container.

Each pressurized container is designed to withstand a maximum allowable working pressure. If the pressure of the fluid within the container were to exceed this maximum allowable working pressure without activation of the pressure reduction device, the container could become unsafe. To ensure that the pressure of the container does not exceed the maximum allowable working pressure and the relevant design code permitted overpressure, a pressure reduction device that is configured to activate at a pressure that is within a certain tolerance (e.g. 105%) of the maximum allowable working pressure may be engaged in the container.

Ensuring that the pressure reduction equipment activates at the rated pressure, or within a manufacturing tolerance of the rated pressure, is of great importance. If the pressure reduction device activates at a pressure that is higher than the rated pressure, the fluid pressure may exceed the maximum allowable working pressure. If the pressure reduction device activates at a pressure that is lower than the rated pressure, the activation may interfere with the normal operation of the system and could potentially result in the premature loss of fluid from the system.

The pressurized containers may further include a pressure control system that is designed to prevent the pressurized container from experiencing potentially hazardous over-pressure or under-pressure conditions. These pressure control systems monitor the pressure of the fluid within the container. When the fluid pressure approaches a predetermined pressure limit that is indicative of an impending over-pressure or under-pressure condition, the pressure control system may activate a control device, such as, for example, a control valve that injects a chemical reaction agent, catalyst, quenching agent, or stabilizer into the working fluid. The activation of the pressure control system may thereby avoid the need to create a vent path to reduce the pressure of the fluid in the pressurized system. Alternatively, the pressure control system may activate a pressure release device, such as, for example, a butterfly valve, a ball valve, or a globe valve, to release fluid in a sufficient quantity to avoid or limit the over-pressure or under-pressure condition. Thus, the control system may automatically handle the opening and closing of a vent path in a pressure release device to reduce the pressure within the container.

The pressurized containers may use a combination of pressure control devices and pressure reduction devices. These pressure control devices monitor the pressure of the fluid within the container. When the fluid pressure reaches a level that may be too low or too high for the proper function of the pressure release device, the pressure control system may activate an annunciation system to alert the user to the improper operating condition of the pressurized container. A pressure relief device may additionally be used to provide automatic release of fluid in a sufficient quantity to avoid or limit an overpressure or under-pressure condition.

The pressurized containers may also include a pressure indicating device that identifies the depletion of the fluid within the container. These pressure indicating devices can be used to prevent the containers from experiencing potentially low or high pressure conditions that might inconvenience the user. The pressure indicating devices are designed to trigger a response, such as the opening of a supply valve, when the pressure of the fluid within the system reaches a predetermined low pressure limit that is indicative of the fluid becoming depleted. Such pressure indication can also trigger a response when the pressurized container is reaching a potentially damaging vacuum condition.

The pressurized containers may further include a pressure indicating device that identifies the increase in quantity of the fluid within the container. These pressure indicating devices can prevent the containers from experiencing potentially high pressure conditions that might damage the container. The pressure indicating devices are designed to trigger a response, such as, for example, the opening or closing of a supply valve, when the pressure of the fluid within the system reaches a predetermined pressure limit that is indicative of the system becoming filled with fluid.

It has been found that the operating conditions of the fluid container, such as, for example, the temperature and pressure of the fluid, may have an impact on the operation of the above-described pressure reduction devices and information providing devices that may be engaged with the container. For example, the operating conditions of the container may have an impact on the pressure at which a pressure relief device activates. In some situations, the operating conditions of the container may cause the pressure relief device to activate at a pressure that is lower than expected. In other situations, the operating conditions of the container may cause the pressure relief device to activate at a pressure that is higher than expected.

In a container that uses a rupture disk as a pressure relief device, the temperature of the fluid in the container may impact the pressure at which the rupture disk will activate. The activation pressure of the rupture disk is determined, in part, by the physical properties of the material used to form to the rupture disk. Excessive heat or excessive cold may alter the physical properties of the material, thereby altering the activation pressure of the rupture disk. Other operating conditions, such as, for example, pressure fluctuations, pressure levels, vibration frequencies and amplitudes, and acidity levels could also have an impact on the activation pressure of the rupture disk or other such pressure relief device.

Similarly, the operating conditions of the container may also impact the operation of a pressure release device, a pressure control device, and/or a pressure indicating device. For example, excessive pressures or temperatures may impact the ability of a pressure control device to deliver a stabilizing agent to a chemical reaction process before an over-pressure condition is reached. In addition, the operating conditions may prevent a pressure indicating device from providing accurate pressure indications.

Early identification of an operating condition that may impact the operation of a pressurized container fluid system or an associated pressure release devices, pressure relied device, and/or pressure control device may allow an operator to take corrective action. For example, the affected device could be repaired or replaced after experiencing a potentially problematic operating condition. In this manner, the reliability of the pressurized container fluid system and the associated safety and informational systems could be maintained.

In light of the foregoing, there is a need for a method and system for monitoring the operating conditions experienced by a pressurized container to identify conditions that may have an impact on the operation of a pressure reduction device, a pressure control system, and/or an information providing device that is engaged with the container.

SUMMARY OF THE INVENTION

Accordingly, the present invention is directed to a method and system for monitoring operating conditions experienced by a pressurized container and the associated pressure reduction devices, pressure control systems, or information providing devices that obviates one or more of the limitations and disadvantages of prior art monitoring devices. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a monitoring system for a pressurized container having at least one auxiliary device. The system includes a sensor that is operatively disposed in the pressurized system and generates a monitoring signal representative of at least one operating condition of the pressurized container. A control is operably connected to the sensor and is operable to receive the monitoring signal and to generate a warning when the at least one operating condition of the pressurized container will impact the operation of the auxiliary device.

In another aspect, the present invention is directed to a method of monitoring conditions experienced by a pressurized container. At least one operating condition of the pressurized container is sensed. A monitoring signal representative of at least one operating condition of the pressurized container is generated. The monitoring signal is received. A warning is issued when the at least one operating condition of the pressurized container will impact the operation of the auxiliary device.

In still another aspect, the present invention is directed to a method of monitoring conditions experienced by a pressure reduction device that is sealingly engaged with a pressurized container. A series of monitoring signals that are representative of at least one operating condition of the pressurized container are received. Each of the monitoring signals represent the operating condition existing at a particular time. Each monitoring signal is stored in a first memory. A pressure event signal is received from a pressure event sensor. A historical set of monitoring signals are transmitted to a second memory. The historical set contains the monitoring signals received during a predetermined time period immediately prior to receipt of the pressure event signal.

In yet another aspect, the present invention is directed to a monitoring system for a pressure reduction device that is sealingly engaged with a pressurized container. The system includes a pressure event sensor operable to generate an event signal when a significant pressure event is identified. A condition sensor is disposed in the pressurized container and is operable to generate an operational signal representative of at least one operating condition of the pressurized container for a particular time. A control is operable to receive the signals from the pressure event sensor. The control has a first memory for storing a historical set of operational signals representative of the at least one operating condition over a predetermined time period and a second memory. The control transfers the historical set of operational signals to the second memory upon receipt of the event signal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and together with the description, serve to explain the principles of the invention. In the drawings.

DETAILED DESCRIPTION

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a monitoring system for a pressurized container is shown in FIG. 1 and is designated generally by reference number 10.

In accordance with the present invention, a monitoring system for a pressurized container is provided. The monitoring system of the present invention may be used with any pressurized container that includes an auxiliary device, such as, for example, a safety device, a pressure reduction device, a pressure control system, or an information-providing device. Such pressure reduction devices may include, for example, pressure relief devices and pressure release devices. Such information-providing devices may include, for example, pressure indicating devices and devices that indicate when a container is full or empty.

Figure 1:
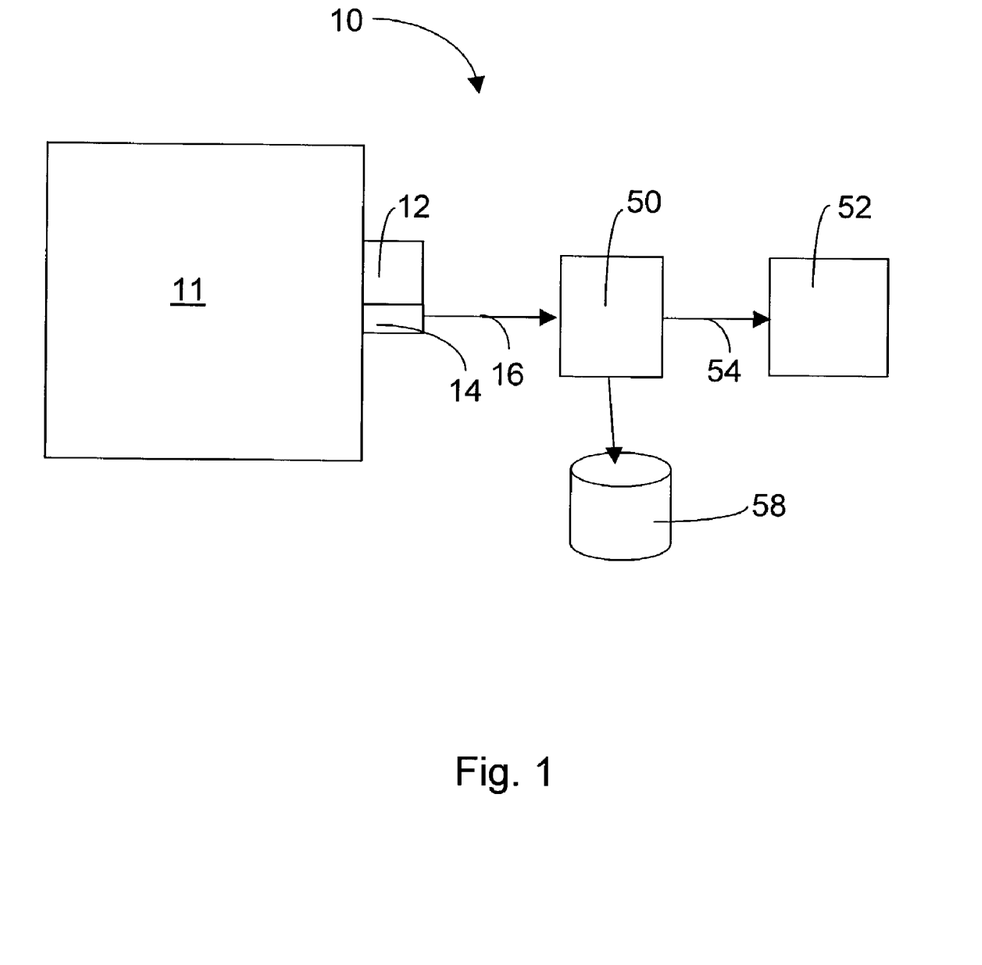
FIG. 1 is a schematic and diagrammatic illustration of a monitoring system for a pressurized container in accordance with an embodiment of the present invention.

As illustrated in FIG. 1, an auxiliary device 12 is engaged with a container 11 that contains a pressurized fluid or a fluid that may be pressurized. For the purposes of the present disclosure, the term "container" is used broadly and is intended to include any type of pressurized system, piping, tank, or other such apparatus. Auxiliary device 12 is exposed to the fluid within container 11 so that the auxiliary device may perform its intended function. For example, auxiliary device 12 may be a pressure relief device that is configured to activate, or open, when a fluid within the system reaches a predetermined pressure level. The pressure relief device may be, for example, a rupture disk, a pressure relief valve, a pressure safety valve, a control valve, a buckling pin device, a tank vent, an explosion panel, or another similar device.

Alternatively, auxiliary device 12 may be a pressure reduction device that is configured to activate in response to an external force. The pressure reduction device may activate manually in response to a command from an operator or automatically in response to a signal from an automatic control system. The pressure reduction device may be activated when the operator or automatic control system detects a condition that warrants release of fluid from container 11.

As is known in the art, the pressure relief device may be engaged with container 11 in any manner that will expose an operative portion of the pressure relief device to the fluid contained within container 11. When the fluid in the container reaches the predetermined pressure level, the pressure relief device will activate to create a vent path, or opening, through which fluid may escape from the container to reduce the pressure in the container. It is contemplated that multiple pressure relief devices may be engaged at different locations within or adjacent container 11.

Figure 2:
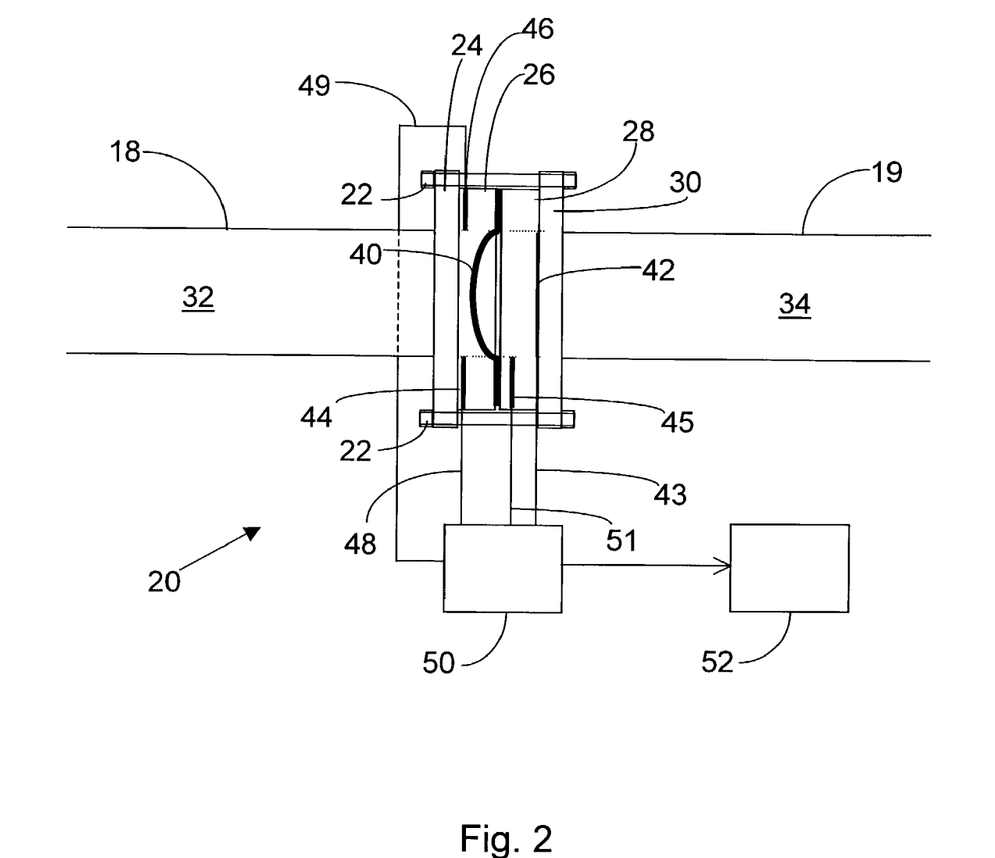
FIG. 2 is a schematic and diagrammatic illustration of one embodiment of a monitoring system for a pressure relief device in accordance with an embodiment of the present invention.

In the exemplary embodiment of the monitoring system illustrated in FIG. 2, the auxiliary device 12 is a rupture disk 40. Rupture disk 40 is sealingly engaged between an inlet safety head 26 and an outlet safety head 28. Inlet and outlet safety heads 26, 28 are then secured between an inlet pipe 18 and an outlet pipe 19. The present invention contemplates that rupture disk 40 may be engaged with container 11 in any manner readily apparent to one skilled in the art, such as, for example, between tri-clamp sanitary flanges, between screw-threaded connections, welded to the container, or directly between pipe flanges.

Inlet pipe 18 includes an inlet flange 24 and outlet pipe 19 includes an outlet flange 30. A series of bolts 22 secure inlet flange 24 to outlet flange 30. When bolts 22 are tightened, a force is exerted through inlet flange 24 and inlet safety head 26 and outlet flange 30 and outlet safety head 28. This force sealingly engages the rupture disk 40 with container 11.

In the embodiment of FIG. 2, inlet pipe 18 has an opening 32 that provides a fluid pathway to rupture disk 40. Inlet safety head 26 includes an opening that exposes a rupturable portion of rupture disk 40 to the fluid within container 11. The rupturable portion of rupture disk 40 is configured to rupture when the pressure differential across the rupturable portion of the rupture disk reaches a predetermined limit. The rupture of rupture disk 40 creates a pathway through which fluid may escape from container 11.

Outlet pipe 19 has an opening 34 that provides a vent path for fluid that escapes container 11 through the burst and therefore open rupture disk. Outlet pipe 19 may lead to an overflow reservoir (not shown). Alternatively, if the fluid within container 11 is not hazardous, rupture disk 40 may vent directly to the environment or outlet pipe 19 may direct the escaping fluid to the environment.

With reference to FIG. 1, a sensor 14 is operatively disposed in container 11 to monitor at least one operating condition of container 11. It is contemplated, however, that multiple sensors may be operatively disposed in container 11 and/or auxiliary device 12 to monitor several operating conditions simultaneously at the inlet, outlet, or both the inlet and outlet of the device. The monitored operating conditions may include, for example, inlet pressure, outlet pressure, fluid temperature, fluid pH level/acidity level, vibration frequency and/or amplitude, and fluid level. The present invention contemplates that other operating conditions may also be monitored.

Sensor 14 generates a signal 16. Signal 16 may include a representation of a single operating condition of container 11. Alternatively, signal 16 may include a representation of multiple operating conditions of container 11.

In the rupture disk embodiment illustrated in FIG. 2, a first pressure sensor 44 may be exposed to the system fluid on the inlet side of rupture disk 40. As shown, first pressure sensor 44 may be disposed in inlet safety head 26. Alternatively, first pressure sensor 44 may be disposed further upstream of inlet safety head 26 or may be attached directly to pressurized container 11. First pressure sensor 44 generates a signal that is representative of the fluid pressure exerted on the inlet side of rupture disk 40.

A second pressure sensor 45 may be exposed to the system fluid on the outlet side of rupture disk 40. As shown, second pressure sensor 45 may be disposed in outlet safety head 28. Alternatively, second pressure sensor 45 may be disposed further downstream of outlet safety head 28. Second pressure sensor 45 generates a signal that is representative of the fluid pressure exerted on the outlet side of rupture disk 40.

In addition, a temperature sensor 46 may be exposed to the system fluid on the inlet side of rupture disk 40. As shown, temperature sensor 46 may be disposed in inlet safety head 26. Alternatively, temperature sensor 46 may be disposed further upstream of inlet safety head 26 or may be attached directly to pressurized container 11. Temperature sensor 46 generates a signal that is representative of the sensed temperature of the system fluid.

The present invention contemplates that a pressure event sensor 42 may be operatively engaged with pressure relief device 12. In the embodiment illustrated in FIG. 2, pressure event sensor 42 is a "burst sensor" that generates a signal when rupture disk 40 activates. The burst sensor may be a "broken wire" burst sensor, such as, for example, the Burst Alert Sensor manufactured by BS&B Safety Systems, Inc. The present invention contemplates, however, that different types of pressure event sensors, such as, for example, leak sensors, magnetically activated proximity switches, and pressure switches, that are adapted for use with different types of pressure relief or control devices may also be used.

As illustrated in FIG. 2, a pressure event sensor 42 is positioned on outlet safety head 28. Pressure event sensor 42 includes a wire 43 disposed proximate outlet safety head 28. Wire 43 is connected to a power source (not shown), which may be, for example, a battery. The power source and wire 43 form an electrically-powered circuit that traverses the outlet flow path from rupture disk 40.

When rupture disk 40 ruptures and allows fluid to flow into outlet pipe 19, the force of the fluid, the shock wave generated in the piping due to the rupture of the rupture disk, physical contact with the ruptured disk, or a combination of these events will break wire 43. In addition, if rupture disk 40 exhibits leakage, the resulting fluid build-up against pressure event sensor 42 would be sufficient to break an appropriately configured wire 43. When wire 43 breaks, the electrically-powered circuit changes from a closed circuit to an open circuit. The opening of the circuit is a signal that indicates that the pressure relief device has activated or is leaking.

The present invention contemplates that sensor 14 may be of any type readily apparent to one skilled in the art. For example, sensor 14 may be a fluid pH/acidity level sensor, a vibration sensor, of a fluid level sensor.

As illustrated in FIG. 1, a control 50 is operatively connected to sensor 14 to receive the generated signal 16. Control 50 processes signal 16 to identify operating conditions that warrant sending a warning to an operator, such as when the operation conditions may impact the operation of auxiliary device 12. Control 50 may generate a warning when an operator should be alerted to an operating condition that may impact the operation of the auxiliary device.

Sensor 14 may send signal 16 to control 50 through a hard-wire connection. Alternatively, sensor 14 may include a transmitter that sends a wireless signal 16 to control 50. It is contemplated that the wireless communication may be an transmission that has a frequency of between about 902 and 928 MHz. The wireless communication may occur at any licensed or unlicensed RF frequency band or at some other acceptable frequency.

The wireless communication may use any one of a number of standard communication protocols, including, for example: short range wireless standards and techniques such as bluetooth; $3^{rd}$ generation digital phone service; global system for mobile communication "GSM"/code-division multiple access "CDMA"; short message service "SMS"; wireless Ethernet "Wi-Fi"; or wireless application protocol "WAP." In addition, the wireless communication may be configured for "frequency hopping," where the frequency that the wireless communication uses varies between successive transmissions. The wireless communication may utilize any common "frequency hopping" algorithm readily apparent to one skilled in the art.

Control 50 may also be connected to an internal or external memory 58. Control 50 may store a history of the operating conditions experienced by pressurized container 11 and/or auxiliary device 12 in memory 58. The stored history may be a compilation of raw data such as a history of sensor 14 sent via signal 16. Alternatively, control 50 may process signals 16 and store only certain data in memory 58 that is identified during processing.

Figure 3:
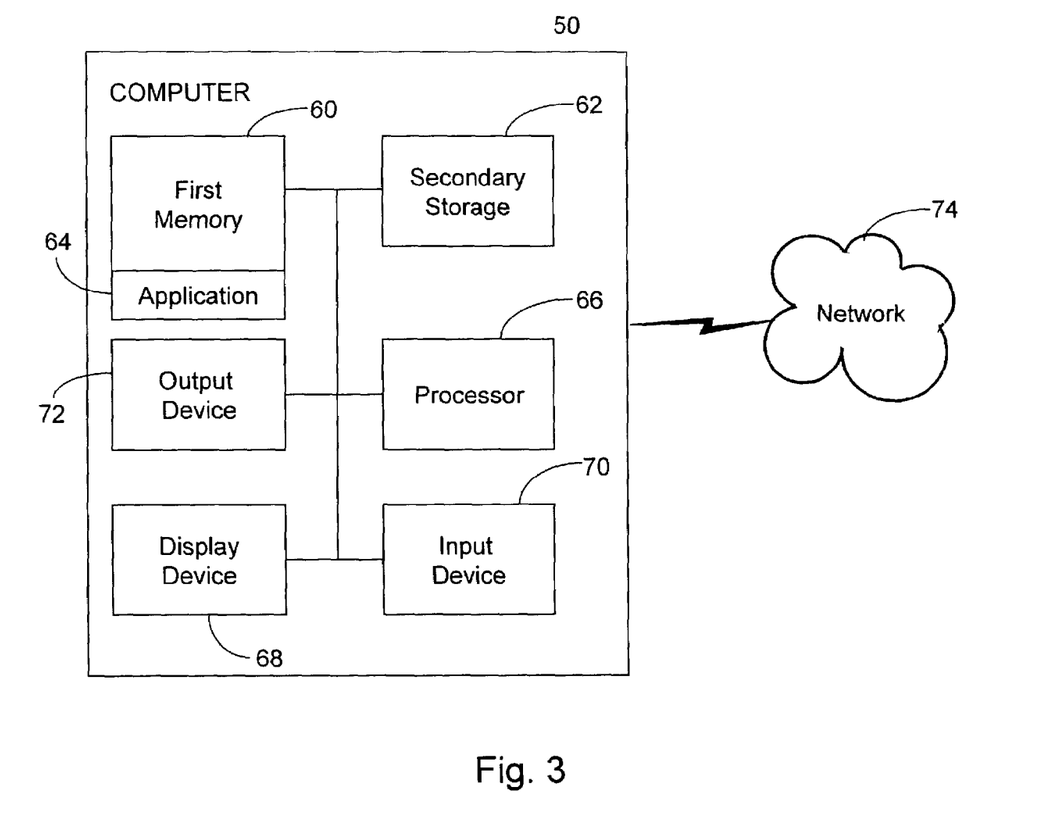
FIG. 3 is a schematic and diagrammatic illustration of a control for a monitoring system according to an embodiment of the present invention.

Control 50 may include a processor or computer. FIG. 3 depicts in more detail a computer suitable for use with control 50. As shown, the computer may have a first memory 60, a secondary storage 62, a processor 66, such as a central processing unit, an input device 70, and an output 72. The computer may also include a display device 68. First memory 60 and secondary storage 62 may store applications, such as application 64, or information for execution and use by processor 66. The present invention contemplates that the computer may be connected to a network 74, such as the Internet.

Although the computer is depicted with various components, one skilled in the art will appreciate that this computer can contain additional or different components. Furthermore, although aspects of the present invention are described as being stored in memory, one skilled in the art will appreciate that these aspects can also be stored on or read from other types of computer program products or computer-readable media, such as computer chips and secondary storage devices, including hard disks, floppy disks, or CD-ROM, or other forms of RAM or ROM. These aspects of the present invention may also include modules, implemented in software, hardware, or a combination, configured to perform a particular method implementing an embodiment consistent with the present invention. In addition, the computer-readable media may include instructions for controlling a computer system to perform a particular method.

In the embodiment illustrated in FIG. 2, control 50 is configured to receive signals representative of the operating conditions of the container and perhaps also the auxiliary device(s) as generated by the temperature, pressure, and burst sensors. Control 50 is connected to first pressure sensor through wire 48, to second pressure sensor through wire 51, to temperature sensor through wire 49, and to pressure event sensor 42 through wire 43. Each of the sensors may generate and transmit signals representative of their respective function on either a continuous or periodic basis. Control 50 receives each signal and processes the signals. The signals may be transmitted through a hard-wire connection or through wireless communication to control 50. The present invention contemplates that that the signals generated by each of the condition sensors may be transmitted to control 50 through a bus system, such as, for example, a Fieldbus, Modbus, or a Profibus, that uses a single two-wire connection to distribute the output from an array of applied sensors. Control 50 may be programmed to handle multiple auxiliary devices and pressure containers.

The present invention further contemplates that each of the sensors and control 50 may include a device configured to both send and receive signals, such as, for example, a transceiver. This two-way communication ability may be used to verify that the system is functioning properly. For example, control 50 may send a signal to each sensor to determine if the particular sensor is operational. In response, the sensor may return a signal to control 50 to provide diagnostic information. Based on the returned signal, or the lack of a returned signal, control 50 may determined if each sensor is functioning properly.

As illustrated in FIG. 3, control 50 also includes an input device 70. Input device 70 may be a keyboard or similar device connected to or integral with control 50. Alternatively, input device 70 may be a PC or laptop computer that is separate from control 50. Using input device 70, a user may enter specified performance characteristics that are relevant to the operation of pressure relief device 12. Such performance characteristics may include, for example, the maximum allowable working pressure of the system, the rated activation pressure of the pressure relief device, temperature parameters (i.e. high and low temperatures), allowable back pressures, life cycle information, pressure relief device material information, and threshold parameters (as described in greater detail below).

Control 50 processes the monitoring signals provided by each of the sensors to determine whether an operator should be alerted to the current or past operating conditions. An operator may need to be notified when, for example, the operating conditions will impact the operation of auxiliary device 12 or when container 11 is nearly full or nearly empty of fluid. For example, in the rupture disk embodiment of FIG. 2, control 50 will identify a condition or conditions that may impact the activation pressure of the rupture disk or its longevity in service. If the operating conditions meet certain conditions, control 50 generates a warning 54 (referring to FIG. 1).

In addition, control 50 may be configured to store historical data relating to the operating conditions of container 11 and the function of auxiliary device 12 in internal or external memory 58. In one currently contemplated embodiment, control 50 stores a series of monitoring signals in first memory 60. The stored monitoring signals represent the system operating conditions for a recent period of time, such as, for example, the previous 15 minutes. When new monitoring signals are received, the new signals are stored in first memory 60 and the oldest signals are deleted from first memory 60. In this manner, control 50 maintains a record of the recent operating conditions experienced by auxiliary device 12. Upon receipt of a trigger signal, such as, for example, an event signal from a pressure event sensor, control 50 may transmit the history of signals stored in first memory 60 to secondary storage 62. This history of signals can then be analyzed to provide information regarding the container operating conditions immediately prior to the receipt of the trigger signal.

As also shown in FIG. 1, an alerting device 52 may be in communication with control 50. Alerting device 52 may communicate with control 50 through a hard-wire connection or through a wireless communication protocol. The present invention contemplates that alert device 52 may be any device capable or displaying or providing the warning generated by control 50. Such devices may include, for example, computer monitors, light emitting diodes, sound generating devices, pagers, Internet based services, processors with integral LCD displays, and mobile phones.

The following discussion generally describes several processing methods in which control 50 may determine that the operating condition(s) warrant the generation of a warning message, such as when the operating condition(s) will impact the operation of the pressure relief device. These processing methods are described in connection with the rupture disk embodiment as illustrated in FIG. 2. The present invention contemplates that similar processing methods may be used in conjunction with other types of safety devices and/or pressure information providing devices.

Pressure Conditions

Figure 4:
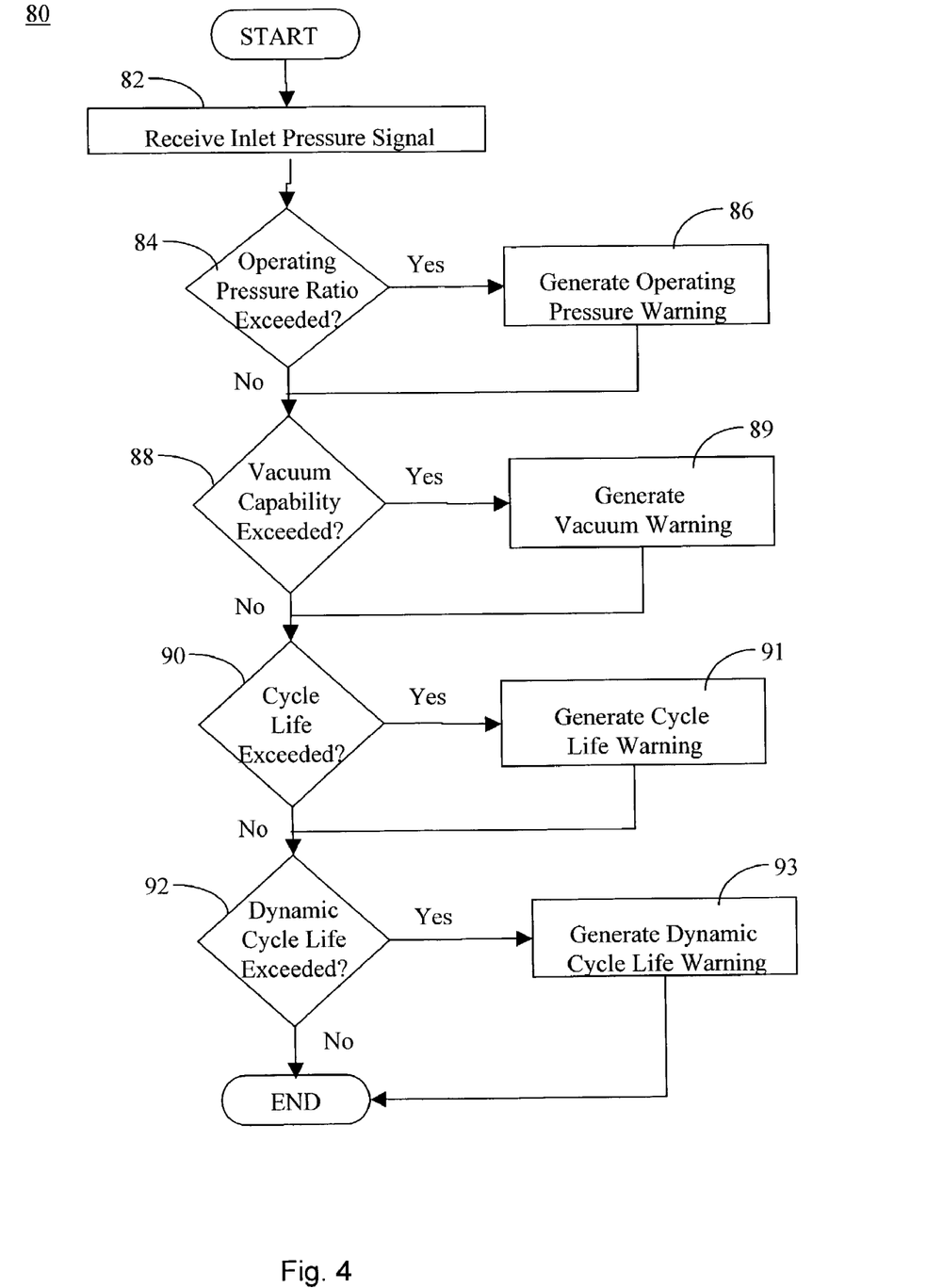
FIG. 4 is a flowchart illustrating a method of monitoring inlet pressure conditions experienced by a pressure relief device in accordance with an embodiment of the present invention.

The flowchart of FIG. 4 illustrates a first exemplary method 80 of analyzing sensed pressure signals generated by first pressure sensor 44. As discussed above, control 50 receives a signal from first pressure sensor 44 that is representative of the fluid pressure on the inlet side of rupture disk 40. (Step 82).

Control 50 then determines if the operating pressure ratio of the disk has been exceeded. (Step 84) The operating pressure ratio of the rupture disk is exceeded when the pressure sensed by first pressure sensor 44 is greater than an operating pressure ratio threshold. The operating pressure threshold is typically defined as a percentage of the activation pressure of the rupture disk. Control 50 is programmed to recognize this percentage or its actual pressure value. Preferably, the information needed to determine if the operating pressure ratio is exceeded is input to control 50 as part of the performance characteristics for the particular pressure relief device during the application set up programming of the control. If the sensed pressure is greater than this threshold, an operating pressure warning is generated. (Step 86).

The generated warning may be any type of alert designed to notify an operator of a potential problem. For example, the warning may be a message displayed on a monitor, an activated light emitting diode, a sound alarm, or the activation of a remote device, such as a pager or a cellular phone. Preferably, the generated warning includes a message or other indication of the operating condition that triggered the warning. For example, the operating pressure warning may include a message such as "Operating Pressure Ratio Exceeded."

Control 50 also determines if the vacuum capability of rupture disk 40 has been exceeded. (Step 88) A vacuum threshold for the particular rupture disk may be input into control 50 as part of the performance characteristics or a default value may be used. If the pressure sensed by first pressure sensor 44 is below the vacuum threshold, a vacuum warning is generated (step 89) to alert an operator to the vacuum condition.

Control 50 also determines if the cycle life of rupture disk 40 has been exceeded. (Step 90). A "pressure cycle" occurs when the pressure of the system fluctuates between a lower and an upper value. The parameters defining the upper value may be input into control 50 or default values used. When a pre-determined number of pressure cycles have been experienced, control 50 will generate a "cycle life exceeded" warning. (Step 91).

The number of "pressure cycles" experienced by rupture disk 40 may be calculated in several different ways. In one currently contemplated embodiment, a cycle count will be incremented when rupture disk 40 experiences a pressure fluctuation from the lower threshold to upper threshold and back to the lower threshold. Alternatively, the cycle count may be incremented when rupture disk 40 experiences a pressure fluctuation from the upper threshold to the lower threshold and back to a upper threshold.

Control 50 may also store a "hysteresis" value for cycle counting purposes. The "hysteresis" value identifies a pressure change that may impact the cycle life of the rupture disk but does not meet the threshold criteria described above. When the rupture disk 40 experiences a pressure fluctuation that is within the upper and lower thresholds and is greater than the hysteresis value, this pressure fluctuation may be counted as a cycle. For example, a rupture disk may have a lower cycle threshold of 75 psi, an upper cycle threshold of 92 psi, and a hysteresis value of 10 psi. Each time that the pressure within the system fluctuates by 10 psi but does not reach either 75 psi or 92 psi, the cycle count may be incremented. With this approach, all pressure fluctuations that may have an impact on the cycle life of rupture disk 40 will be counted.

Control 50 further determines if the dynamic cycle life is exceeded. (Step 92). The dynamic cycle life is a measure of the number of times the pressure differential across the disk changes from negative to positive or from positive to negative. The values defining the dynamic cycle life may be input into control 50 or default values may be used. Control 50 maintains a count of the number of times the pressure sensed by first pressure sensor 44 changes from positive to negative or negative to positive. After a pre-determined number of changes, control 50 issues a "dynamic cycle life exceeded" warning. (Step 93).

Figure 5:
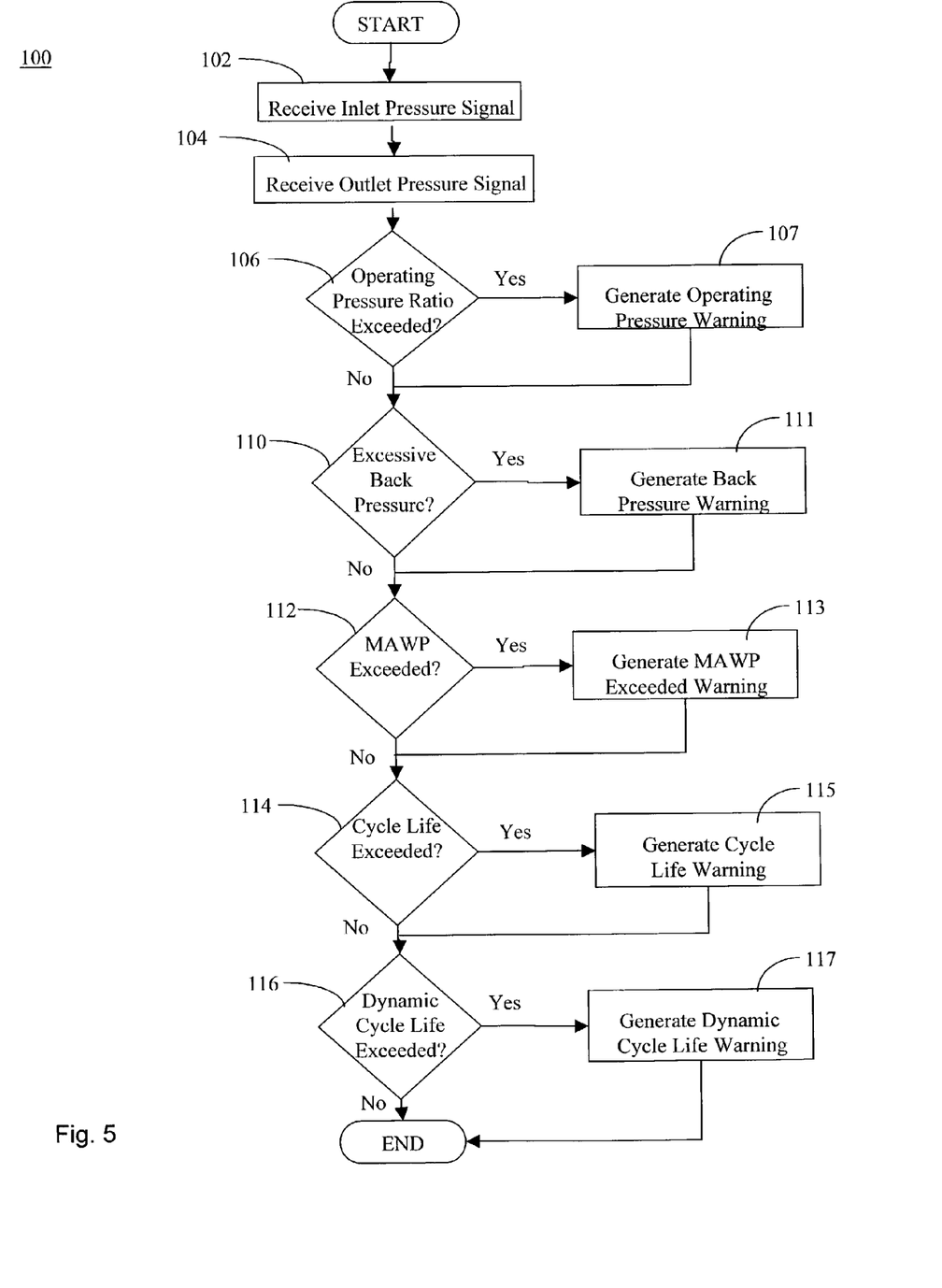
FIG. 5 is a flowchart illustrating a method for monitoring inlet and outlet pressure conditions experienced by a pressure relief device in accordance with an embodiment of the present invention.

The flowchart of FIG. 5 illustrates a second exemplary method 100 of analyzing sensed pressure signals from both first pressure sensor 44 and second pressure sensor 45. As discussed above, control 50 receives a signal from first pressure sensor 44 that is representative of the fluid pressure on the inlet side of rupture disk 40 (step 102) and a signal from second pressure sensor 45 that is representative of the fluid pressure on the outlet side of rupture disk 40 (step 104).

Control 50 determines if the operating pressure ratio has been exceeded. (Step 106). When both the inlet and outlet pressure signals are received, control 50 determines if the pressure differential, i.e. inlet pressure−outlet pressure, exceeds the operating pressure ratio threshold. As noted above, the operating pressure ratio is determined as a percentage of the activation pressure of rupture disk 40. The parameters defining the operating pressure ratio threshold may be input into control 50 or default values may be used. If the pressure differential exceeds the operating pressure ratio threshold, an "operating pressure ratio" warning is generated. (Step 107).

Control 50 may also determine if there is an excessive back pressure. (Step 110). An excessive back pressure may exist if the pressure sensed by second pressure sensor 45 is above a certain level. An excessive back pressure may also exist if the pressure differential over rupture disk 40 is negative, i.e. the outlet pressure is greater than the inlet pressure, and the negative pressure differential exceeds a predetermined limit. Parameters defining the back-pressure conditions may be input into control 50 or default values may be used. If either of the back-pressure conditions exist, a "back pressure" warning is generated. (Step 111).

Control 50 may also determine if the maximum allowable working pressure of the system is being exceeded. (Step 112) As described previously, rupture disk 40 will activate when the pressure differential across the rupture disk is greater than the activation pressure. If a sufficient back pressure is exerted on the rupture disk, it is possible that the inlet pressure may rise above the maximum allowable working pressure without activation of the rupture disk. This condition could place the entire system at risk. If this condition is detected, control 50 generates a "MAWP exceeded" warning. (Step 113).

Control 50 also determines if the cycle life is exceeded. (Step 114). A "pressure cycle" may also occur when the pressure differential over rupture disk 40 cycles between a lower threshold and an upper threshold. The parameters defining the upper and lower threshold may be input into control 50 or default values may be used. After a certain number of pressure cycles are experienced, control 50 will generate a "cycle life exceeded" warning. (Step 115).

Control 50 may also determine if the dynamic cycle life is exceeded. (Step 116). As noted above, the dynamic cycle life is measured as the number of times the pressure differential across the disk changes from negative to positive or from positive to negative. Control 50 maintains a count of the number of times the pressure differential changes from positive to negative or negative to positive. After a predetermined number of changes, control 50 issues a "dynamic cycle life exceeded" warning. (Step 117).

Control 50 may also use the information provided by the pressure and temperature sensors to drive a controlled safety pressure relief system ("CSPRS"). If the monitored conditions indicate an impending over-pressure condition, control 50 may activate the CSPRS to alleviate or prevent the over-pressure condition. The activation of the CSPRS may result in the opening of a control valve that injects a chemical reaction agent, catalyst, or stabilizer into the working fluid or in the activation of a valve, such as, for example, a butterfly valve or globe valve, that will allow the release of fluid in a sufficient quantity to avoid or limit the over-pressure or under-pressure condition. Control 50 may also generate an appropriate warning to alert an operator to the activation of the CSPRS.

Temperature Conditions

Figure 6:
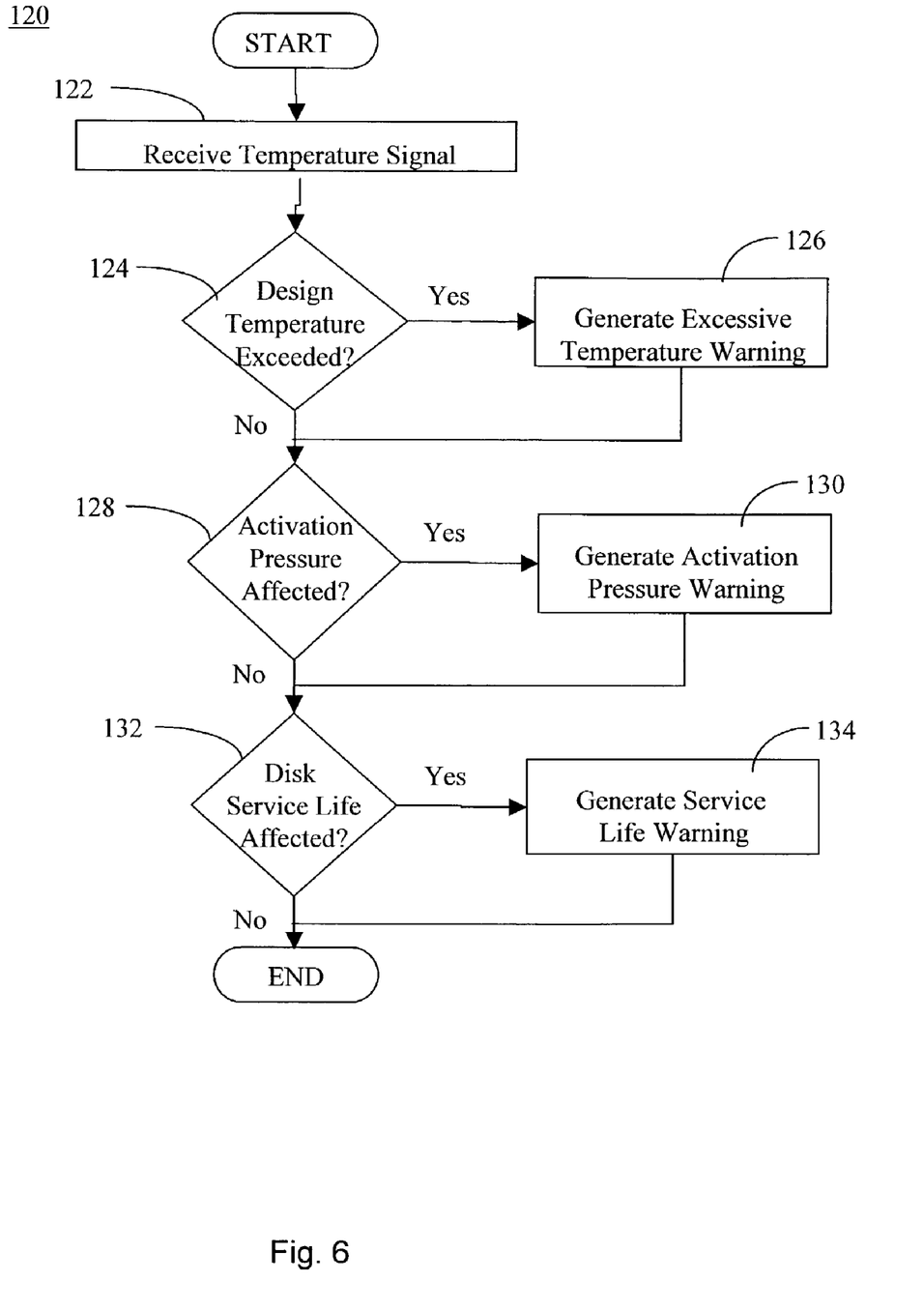
FIG. 6 is a flowchart illustrating a method for monitoring temperature conditions experienced by a pressure relief device in accordance with an embodiment of the present invention.

The flowchart of FIG. 6 illustrates an exemplary method 120 of analyzing sensed temperature signals generated by temperature sensor 46. As discussed above, control 50 receives a signal from temperature sensor 46 that is representative of the fluid temperature on the inlet side of rupture disk 40. (Step 122).

Control 50 determines if the design temperature is exceeded. (Step 124). The design temperature is exceeded if the sensed temperature is greater than an upper threshold or is less than a lower threshold. These thresholds may be input into control 50 or default values used. Under either condition, control 50 will generate an "excessive temperature" warning. (Step 126).

Control 50 may also determine if the temperature of the fluid in the system will affect the activation pressure of rupture disk 40. (Step 128). The activation pressure of rupture disk 40 may be affected if the temperature of the fluid in the system deviates from a certain limit. The type of material used in rupture disk 40 may be stored in the memory of control 50 along with a pressure/temperature curve for the particular material. The pressure/temperature curve identifies the amount of change in the activation pressure of the rupture disk over a range of temperatures. If control 50 determines that the current temperature of the system will increase the activation pressure of the rupture disk by a certain percentage, such as, for example, 5%, an "activation pressure affected" warning is generated. (Step 130).

Control 50 may also determine if the temperature of the fluid in the system will affect the service life of rupture disk 40. (Step 132). The service life of rupture disk 40 may be affected if the temperature of the fluid in the system is above a certain limit. A higher than expected temperature may cause the rupture disk to activate at a lower pressure, or pressure differential. Control 50 uses the stored pressure/temperature curve for the particular rupture disk material to determine if the activation pressure of the rupture disk will be decreased by a certain percentage, such as, for example, 5%. If this condition exists, control 50 generates a "service life affected" warning. (Step 134).

It is contemplated that control 50 may use a combination of the pressure and temperature determinations described above to identify additional conditions that would require a warning to be generated. For example, if the fluid temperature in the system rose to a limit that would result in a decrease in the activation pressure, control 50 may use the decreased activation pressure as the basis for operating pressure ratio threshold calculation. In this scenario, the operating pressure ratio threshold would be also be decreased to account for the decreased activation pressure. The decrease in the operating pressure ratio threshold may be proportional to the decrease in activation pressure.

Activation Conditions

Control 50 may also generate one or more warnings in response to received signals that indicate rupture disk 40 has experienced a pressure event, such as, for example, activation or leaking. As described in greater detail below, these conditions are identified by signals received from one or more of pressure event sensor 42, first pressure sensor 44, and second pressure sensor 45.

When control 50 receives a signal from pressure event sensor 42 that the rupture disk has activated, control 50 verifies that the activation signal is accurate. Control 50 will verify that the sensed pressures on the inlet side and/or the outlet side of rupture disk 40 support the activation signal. For example, a condition where the outlet pressure is at or near atmospheric pressure might indicate that the activation signal was erroneous. In addition, a condition where the inlet pressure does not drop in accordance might also indicate that the activation signal was erroneous. Control 50 may generate a warning to indicate that an activation signal was generated from pressure event sensor 42, but that the pressure readings do not support the activation signal. If the pressure readings do support the activation signal, i.e. the inlet pressure drops and the outlet pressure rises, control 50 may generate a warning that the rupture disk has activated.

Control 50 may also identify a condition where rupture disk 40 has activated, but no activation signal was provided by pressure event sensor 42. This condition may occur in the case of a low pressure rupture, where the fluid flow is not great enough to trigger pressure event sensor 42. This condition might be identified by a drop in inlet pressure accompanied by a rise in outlet pressure. If this condition is detected, control 50 will generate an appropriate warning.

Additional Conditions

Control 50 may also identify additional conditions, such as a suspected rupture disk malfunction. Some rupture disks have a damage ratio that is greater than 1. This indicates that a damaged rupture disk will activate at a pressure that is higher than the rated activation pressure. Control 50 may identify this condition when the inlet pressure or pressure differential, as sensed by first pressure sensor 44 and second pressure sensor 45, exceeds the rated activation pressure by a certain percentage, such as, for example 110%. When this condition is identified, control 50 will generate an appropriate warning.

Control 50 may also alert an operator when container 11 is nearly full or nearly empty of fluid. A sensor, such as, for example, a pressure switch or a pressure indicator, may be connected to container 11 to monitor the fluid level within the container. When the sensor determines that the fluid level in container 11 is approaching a maximum or a minimum, the sensor may send a signal to control 50 indicate an impending over-pressure or under-pressure condition. The signal may be transmitted to control 50 through the wireless communication system described previously. Upon receipt of the signal, control 50 may generate an appropriate warning for the operator. The operator may then open a supply valve to replenish the fluid supply in container 11 or shut of a supply valve to stop the flow of fluid to container 11. For example, if container 11 is used to feed a process, control 50 may generate a warning when the fluid level within container 11 is nearly depleted. Similarly, if container 11 is receiving fluid from a supply tank, control 50 may generate a warning when container 11 has received its required supply of fluid. It is also contemplated that control 50 may be integrated with the supply system to automatically close or open valves to relieve or prevent the over-pressure or under-pressure condition.

As will be apparent from the foregoing disclosure, the pressurized container monitoring system of the present invention provides warnings to alert an operator to potential problems based on the operating conditions of the pressurized container. These problems may be based on the operating conditions experienced by a safety device or an information-providing device. The system and method of the present invention alerts the operator to the problems so that the operator may take corrective action, such as the repair or replacement of the particular device. In this manner, the present invention ensures the integrity and operation of the pressurized system.

It will be apparent to those skilled in the art that various modifications and variations can be made in the method of manufacture of the present invention and in construction of the pressurized container monitoring system without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A monitoring system for a pressurized container having an auxiliary device, the system comprising:
   a sensor operatively disposed in the pressurized container to generate a signal representing a direct measurement within the pressurized container of at least one operating condition of the pressurized container, the signal generated by the sensor being independent from and unaffected by the condition of the auxiliary device; and a control operably connected to the sensor and operable to receive the signal and monitor the signal to generate a warning when the at least one operating condition of the pressurized container system will adversely impact the intended operation of the auxiliary device.

2. The system of claim 1, wherein the auxiliary device is chosen from the group including a pressure relief device, a pressure reduction device, a pressure control device, a pressure indicating device, and a pressure sensing device.

3. The system of claim 1, wherein the auxiliary device is a pressure relief device and the signal is representative of a back pressure exerted on the pressure relief device, and the warning is generated when the back pressure exceeds a back pressure limit.

4. The system of claim 1, wherein the signal is representative of the pH level, and the warning is generated when the pH level is outside of a predetermined pH range appropriate for the proper operation of the auxiliary device.

5. The system of claim 1, wherein the signal is representative of the pressure of a fluid within the pressurized container.

6. The system of claim 5, wherein the system has a maximum allowable working pressure and the warning is generated when the pressure within the system exceeds a threshold that is a predetermined percentage of the maximum allowable working pressure.

7. The system of claim 6, wherein the threshold is approximately 105% of the maximum allowable working pressure.

8. The system of claim 1, wherein the signal is representative of the temperature within the pressurized container.

9. The system of claim 8, wherein the warning is generated when the temperature exceeds a first temperature limit.

10. The system of claim 8, wherein the warning is generated when the temperature falls below a second temperature limit.

11. The system of claim 1, wherein the control includes a first memory configured to store a series of signals received representing a direct measurement within the pressurized container of the at least one operating condition over a predetermined time period.

12. The system of claim 11, further comprising a pressure event sensor operable to generate an event signal when the auxiliary device activates.

13. The system of claim 12, wherein the control includes a second memory means, the control transferring the series of signals received from the first memory to the second memory upon receipt of a burst signal.

14. A method of monitoring conditions experienced by a pressurized container having an auxiliary device, the method comprising the steps of:
sensing at least one operating condition of the pressurized container;
generating a signal representing a direct measurement within the pressurized container of the at least one operating condition of the pressurized container;
receiving the signal;
monitoring the signal;
issuing a warning when the at least one operating condition of the pressurized container will adversely impact the intended operation of the auxiliary device; and
wherein the signal generated is independent from and unaffected by the condition of the auxiliary device.

15. The method of claim 14, wherein the signal is representative of a back pressure exerted on the auxiliary device, and the warning is generated when the back pressure exceeds a back pressure limit.

16. The method of claim 14, wherein the signal is representative of the pH level in the fluid, and the warning is generated when the pH level is outside of a predetermined pH range.

17. The method of claim 14, wherein the auxiliary device is a pressure relief device and further comprising:
inputting a set of performance characteristics of the pressure relief device into a control; and
comparing the at least one operating condition to at least one of the performance characteristics of the pressure relief device.

18. The method of claim 17, wherein the signal is representative of the pressure within the pressurized container.

19. The method of claim 18, wherein the pressurized container has a maximum allowable working pressure and the performance characteristics of the pressure relief device include an operating ratio and a rated pressure, and wherein the warning is generated when the pressure within the system exceeds a threshold determined by multiplying the operating ratio times the rated pressure of the pressure relief device.

20. The method of claim 14, wherein the signal is representative of the temperature within the pressurized container.

21. The method of claim 20, wherein the warning is generated when the temperature exceeds an upper temperature limit.

22. The method of claim 21, wherein the warning is generated when the temperature falls below a lower temperature limit.

23. A method of monitoring conditions experienced by a pressure reduction device sealingly engaged in a pressurized container having an auxiliary device, the method comprising the steps of:
receiving a series of signals representing a direct measurement within the pressurized container of at least one operating condition of the pressurized container, each of the signals received representing a direct measurement of the operating condition existing at a particular time;
storing each signal in a first memory;
receiving a pressure event signal from a pressure event sensor;
transmitting a historical set of signals received to a second memory, the historical set containing the signals received during a predetermined time period immediately prior to receipt of the pressure event signal;
issuing a warning when the at least one operating condition of the pressurized container will adversely impact the intended operation of the auxiliary device; and
wherein the series of signals representing a direct measurement within the pressurized container of at least one operating condition are independent from and unaffected by the condition of the pressure reduction device.

24. The method of claim 23, further comprising the deleting the signals received from the first memory after the predetermined time period has expired.

25. The method of claim 23, further comprising sensing the operating conditions of the pressurized container prior to the step of receiving a series of signals.

26. The method of claim 23, wherein the operating conditions include the temperature within the pressurized container.

27. The method of claim 23, wherein the operating conditions include the pressure within the pressurized container.

28. The method of claim 23, wherein the operating conditions include the pH level within the pressurized container.

29. The method of claim 23, wherein the operating conditions include a back pressure exerted on the pressure reduction device.

30. The method of claim 23, wherein at least one sensor generates the series of signals representing a direct measurement within the pressurized container and the method further comprises sending an interrogation signal to the at least one sensor to determine if the at least one sensor is operational.

31. The method of claim 30, wherein the at least one sensor provides a return signal responsive to the interrogation signal, the return signal providing diagnostic information related to the at least one sensor.

32. A monitoring system for a pressure reduction device sealingly engaged in a pressurized container having an auxiliary device, the system comprising:
- a pressure event sensor operable to generate an event signal upon activation of the pressure reduction device;
- a condition sensor disposed in the pressurized container and operable to generate an operational signal representing a direct measurement within the pressurized container of at least one operating condition of the pressurized container for a particular time, the operational signal generated by the condition sensor being independent from and unaffected by the condition of the pressure reduction device;
- a control operable to receive the signals from the pressure event sensor and condition sensor, the control having a first memory for storing a historical set of operational signals representing a direct measurement within the pressurized container of the at least one operating condition over a predetermined time period and a second memory, the control transferring the historical set of operational signals to the second memory upon receipt of the event signal; and
- wherein the control is operably connected to the condition sensor and operable to monitor the operational signal to generate a warning when the at least one operating condition of the pressurized container system will adversely impact the intended operation of the auxiliary device.

33. The system of claim 32, wherein the operational signal is representative of a back pressure exerted on the pressure reduction device and the control generates an additional warning when the back pressure exceeds a back pressure limit.

34. The system of claim 32, wherein the operational signal is representative of the pH level and the control generates an additional warning when the pH level is outside of a predetermined pH range.

35. The system of claim 32, wherein the control is operable to generate and send an interrogation signal to the condition sensor to determine if the condition sensor is operational.

36. The system of claim 35, wherein the condition sensor is operable to provide a return signal responsive to the interrogation signal, the return signal providing diagnostic information related to the condition sensor.

37. The system of claim 32, wherein the operational signal is representative of the pressure within the pressurized container.

38. The system of claim 37, wherein the system has a maximum allowable working pressure and the control is operable to generate an additional warning when the pressure within the system exceeds a threshold that is a certain percentage of the maximum allowable working pressure.

39. The system of claim 32, wherein the operational signal is representative of the temperature within the pressurized container.

40. The system of claim 39, wherein the control is operable to generate an additional warning when the temperature exceeds an upper temperature limit.

41. The system of claim 39, wherein the control is operable to generate an additional warning when the temperature falls below a lower temperature limit.

* * * * *